(12) United States Patent
Yewdall et al.

(10) Patent No.: US 7,814,929 B2
(45) Date of Patent: Oct. 19, 2010

(54) CLEAN LINE HEATED VALVE

(76) Inventors: Gary Wayne Yewdall, 4 Margaret St Rippleside, Geelong VIC 3215 (AU); Graham William Pickering, 73 Kilgour St., Geelong VIC 3220 (AU)

( * ) Notice: Subject to any disclaimer, the term of this patent is extended or adjusted under 35 U.S.C. 154(b) by 664 days.

(21) Appl. No.: 10/540,663

(22) PCT Filed: Dec. 23, 2003

(86) PCT No.: PCT/AU03/01722
§ 371 (c)(1),
(2), (4) Date: Jun. 23, 2005

(87) PCT Pub. No.: WO2004/057221
PCT Pub. Date: Jul. 8, 2004

(65) Prior Publication Data
US 2006/0144443 A1 Jul. 6, 2006

(30) Foreign Application Priority Data
Dec. 23, 2002 (AU) .............................. 2002953538

(51) Int. Cl.
*F16K 49/00* (2006.01)
(52) U.S. Cl. ........................ 137/341; 251/331
(58) Field of Classification Search .................. 137/334, 137/341; 251/331, 61.1; 138/45
See application file for complete search history.

(56) References Cited

U.S. PATENT DOCUMENTS

| 2,704,085 | A | * | 3/1955 | Wadsworth et al. | 137/81.1 |
| 2,777,463 | A | * | 1/1957 | Boswell | 137/341 |
| 3,560,706 | A | * | 2/1971 | Fonseca | 392/485 |
| 3,580,267 | A | * | 5/1971 | Baker | 137/203 |
| 3,706,872 | A | * | 12/1972 | Trabilcy | 392/469 |
| 3,915,193 | A |  | 10/1975 | Rutt |  |
| 4,977,929 | A |  | 12/1990 | Chinnock et al. |  |
| 5,224,510 | A | * | 7/1993 | Pericles | 137/487.5 |

(Continued)

FOREIGN PATENT DOCUMENTS

EP 0129870 1/1985

OTHER PUBLICATIONS

European Patent Office, Supplementary European Search Report, for the corresponding European Patent Application No. EP 03 78 5408 mailed Dec. 15, 2005.

*Primary Examiner*—John Fox
(74) *Attorney, Agent, or Firm*—Brooks Kushman P.C.

(57) ABSTRACT

A valve of cleanable design capable of maintaining unfavourable conditions for microbial activity on the downstream side and/or outlet of the valve, said valve comprising: A smooth and contoured body (5) with an integral upstream connector (1), downstream connector and defined fluid flow path; a flexible sealing membrane (9) being: (i) selectively moveable into contact with the valve body to close the valve; (ii) selectively moveable out of contact with the valve body to open the valve; (iii) selectively operable to a range of positions to vary the flow rate of fluid through said valve; a defined internal shape that allows the fluid to drain out of the valve body; an elongated heater (7) secured into the valve body in a location so as not to be contact with the fluid or disrupt the internal smooth and contoured body, the heater being operative to heat the valve body to a predetermined temperature.

4 Claims, 3 Drawing Sheets

U.S. PATENT DOCUMENTS

| | | | | |
|---|---|---|---|---|
| 5,520,001 A * | 5/1996 | Miyamoto et al. | | 62/50.2 |
| 5,531,245 A * | 7/1996 | Sparks | | 137/341 |
| 5,837,970 A * | 11/1998 | Jilek | | 219/201 |
| 5,865,421 A * | 2/1999 | Ono | | 251/129.02 |
| 5,941,271 A * | 8/1999 | Chovan | | 137/204 |
| 6,006,701 A * | 12/1999 | Nagano | | 122/367.1 |
| 6,116,267 A * | 9/2000 | Suzuki et al. | | 137/340 |
| 6,227,236 B1 * | 5/2001 | Kusumoto et al. | | 137/341 |
| 6,237,637 B1 * | 5/2001 | Kovacs et al. | | 137/883 |
| 6,311,710 B1 * | 11/2001 | Facas et al. | | 137/1 |
| 6,397,887 B1 * | 6/2002 | Crissman et al. | | 137/597 |
| 6,752,387 B1 * | 6/2004 | Nishizato et al. | | 261/62 |
| 6,805,152 B2 * | 10/2004 | Kanzaka et al. | | 137/341 |
| 6,994,319 B2 * | 2/2006 | Yudovsky | | 251/331 |
| 7,332,040 B1 * | 2/2008 | Kojima et al. | | 118/726 |
| 2001/0028049 A1 * | 10/2001 | Mamyo | | 251/331 |
| 2003/0178064 A1 * | 9/2003 | Fukuda et al. | | 137/341 |

* cited by examiner

CLEAN LINE HEATED VALVE

FIELD OF THE INVENTION

The invention relates to a smooth and contoured heated valve capable of:
  Providing a dry and biostatic environment on the downstream side and/or outlet of the valve.
  Throttling and isolating fluids best handled in a cleanable valve, possessing enhanced properties at elevated temperatures;
  Assist in maintaining sterilising conditions on the process contact side of a valve attached to sterilising apparatus

BACKGROUND OF THE INVENTION

A typical application for the cleanable heated valve is in process industries that require a supply of high purity water within prescribed contamination limits supplied in custom designed systems with specific materials, finishes, process conditions and cleaning requirements, where cleaning can range from simple common cleaning methods to sanitisation and or sterilisation.

Quite often high purity water is required for specific operations in a number of industries, and is required to be supplied at various flow rates through smooth easy to clean valves. Whilst there are commercially available techniques to maintain water quality within the closed piping system, maintaining unfavourable conditions for microbiological activity in the downstream side of the valve and valve outlet that is exposed to the environment, can be a problem especially in systems below 60° C.

The moist, cold to warm environment of the discharge side of the valve and valve outlet, which is exposed to the room air, provides an ideal atmosphere for microbiological activity. Depending upon the size of the outlet and the temperature of the water it is possible for a plug of water to hold-up in the nozzle when not in use further aggravating the problem.

It is possible to steam sterilise the downstream side of the valve and outlet prior to use but this requires more valves, a pure steam supply and associated hardware. It is also not practical to steam sterilise a valve outlet where the water is frequently required. Steam can also be a safety hazard and for the abovementioned reasons steam is not a good general solution to the problem. It is also possible to sanitise the outlet by a number of methods including hot water, chemicals and oxidising agents. Like steam, these methods introduce complications and can only be effective during the sterilisation/sanitisation cycle once removed or when the outlet is reused contamination can begin to reoccur.

Another typical application for the cleanable heated valve is in process industries where there is a need to supply, isolate or regulate the flow of fluids that exhibit enhanced properties at elevated temperatures, in smooth cleanable valves.

A typical example could be the transfer of food products that are processed in systems of specific materials, finishes and clean-ability requirements. Another example could be the transfer of a product that is a liquid above a specific temperature but solidifies below that specific temperature or liquids that tend to create cleaning difficulties at certain temperatures and require cleanable systems including valves.

Another typical application for the cleanable heated valve is isolation valves at the boundary of systems or heat treatment apparatus containing items, products, medium, waste or the like being heat treated, sterilised or decontaminated. It is usually necessary to demonstrate that the required treatment temperature is achieved in all exposed internal regions of the said system or heat treatment apparatus. Quite often these said systems or heat treatment apparatus contain valves to serve a multitude of purposes. Said valves can often provide "cold spots" in such applications due to the mass of metal exposed to the colder outer environment making it difficult to achieve the required treatment temperatures.

In the abovementioned applications it is typical to externally wrap the piping and/or valves and the like with electrical heated wire coils or small bore steam piping, known as heat tracing, or to use steam jackets. Whilst these techniques are successful on interconnecting pipes it is difficult to provide enough energy from the outer exposed surfaces to heat-up the thick mass of metal found in smooth cleanable type valves to achieve the required temperatures on the inside surfaces of the valve. Heat tracing and associated protection coverings when applied to valve bodies can be bulky, difficult to apply efficiently and difficult reapply after removal for maintenance and can create external cleaning issues in hygienic industries.

There are patents existing for heated valves in the casting molten metal industry, refer U.S. Pat. Nos. 5,752,562, 5,531,245

The valves covered in the above mentioned patents comprise of internal joints, crevices, sliding grooves and attachments. The resulting nooks and crannies provide areas for product to lodge, harbouring microbiological contamination and creating difficulties for cleaning. This makes the said valves unsuitable for hygienic industries or where cleaning or sterilisation is an issue. The design of these said valves for the molten metal industry could also contain "cold spots" due to changes in material and limited contact with the metallic body of the heating element. Also, given that the heating element is in contact with the process fluids, there are potential issues with localised hot spots that can denature proteins and certain food products, gaps where product and wastes can lodge between the heater and valve body. It would also be difficult for the said valves to comply with the material compatibility, surface finish, certification and traceability requirements of the food and health science industries.

SUMMARY OF THE INVENTION

The present invention addresses the shortcomings discussed with the current processes and prior inventions. It is an object of the present invention to provide a cleanable heated valve capable of achieving conditions in the downstream side of the valve and outlet that are unfavourable for microbiological activity by assisting in the drying process of the downstream side of the valve body and outlet and maintaining said valve areas dry and at an elevated temperature after use.

It is another object of the present invention to provide a cleanable heated valve that is compact, elegant, simple to use and is available for use as required.

It is another object of the present invention to provide a cleanable heated valve for regulating or supplying medium that exhibit enhanced properties at elevated temperatures by providing sufficient temperature conditions inside the valve as required by the medium for flow and sufficient temperature across the metal sealing face that comes into contact with the flexible sealing membrane.

It is another object of the invention to provide a cleanable heated valve with a polymeric colour coating in selective areas to, minimise the surface temperature for personnel safety, maximise the heat into the valve body and downstream connector and to allow colour coding of valves.

It is another object of the present invention to provide a cleanable heated valve to handle medium that exhibit enhanced properties at elevated temperatures that tend to stick to surfaces or valve discontinuities when hot, or as a result of cooling, or that require stringent cleaning. It is another object of the present invention to provide a heated valve that is smooth, cleanable and able to be constructed from traceable materials suitable for handling of medium for regulated industries such as food, biotech, pharmaceuticals, health sciences and the like.

It is another object of the present invention to provide a cleanable heated valve for systems or heat treatment apparatus containing items, products, medium, waste or the like being heat treated, sterilised or decontaminated, said valve to enable the required temperature to be achieved including the body of said valve exposed to the internal heat treated envelope.

The present invention has an internal smooth and contoured body with an integral upstream connector, downstream connector and defined fluid flow path. The smooth and continuous nature of said valve body allows for thorough cleaning by a range of commercial methods. There is a flexible sealing membrane being:
 i. Selectively moveable into contact with the said valve body to close said valve;
 ii. Selectively moveable out of contact with the said valve body to open said valve.
 iii. Selectively operable to a range of positions to vary the flow rate of fluid through said valve;

Said flexible sealing membrane can remain in place for Clean In Place methods or removable for hand cleaning.

The internal surface of the valve body has a defined shape that allows the medium to drain out of the said valve body if required.

There is an elongate heater secured into said valve body in a location so as not to be in contact with the fluid or disrupt the internal smooth and contoured body, said heater being operative to heat the valve body to the temperature dictated by the process.

When the cleanable heated valve is to be utilised as a plain outlet, the downstream connector can be contoured and smooth to promote free draining including a small discontinuity to break surface tension, to further aid draining.

The heated cleanable valve has a thermodynamic external body shape to maximise achievable temperature into the metal sealing face that comes into contact with the flexible sealing membrane and the downstream side and down stream connector of the said valve.

EMBODIMENTS

Description of the Embodiments

Embodiments of the present invention are described, by way of example only, by reference to the accompanying drawings, it should be noted that the following description is not intended as limiting the broader aspects of the present invention.

Figure 1:
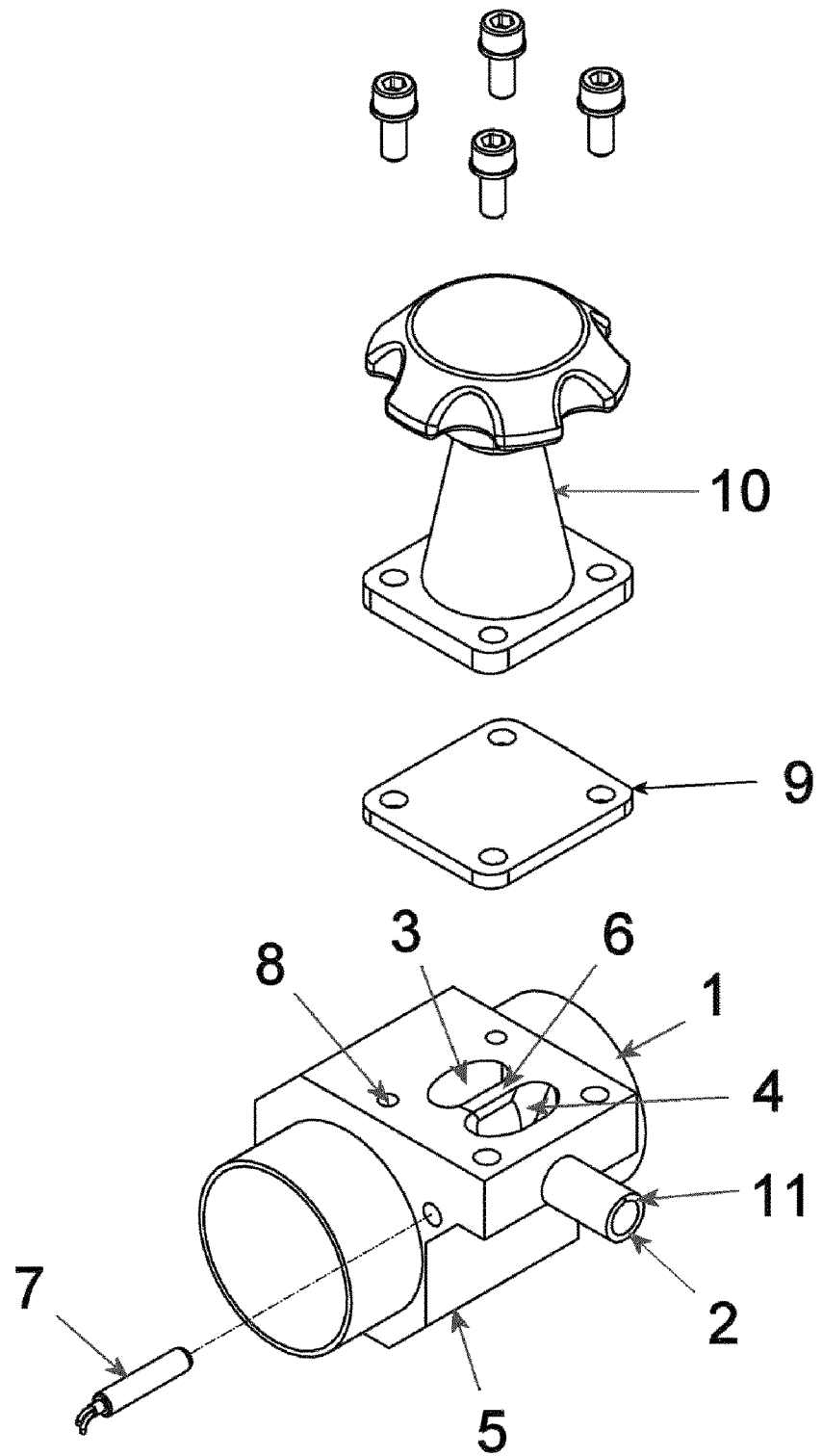
FIG. 1 is an exploded front perspective view of a cleanable heated valve according to an embodiment of the present invention.
Figure 1A:
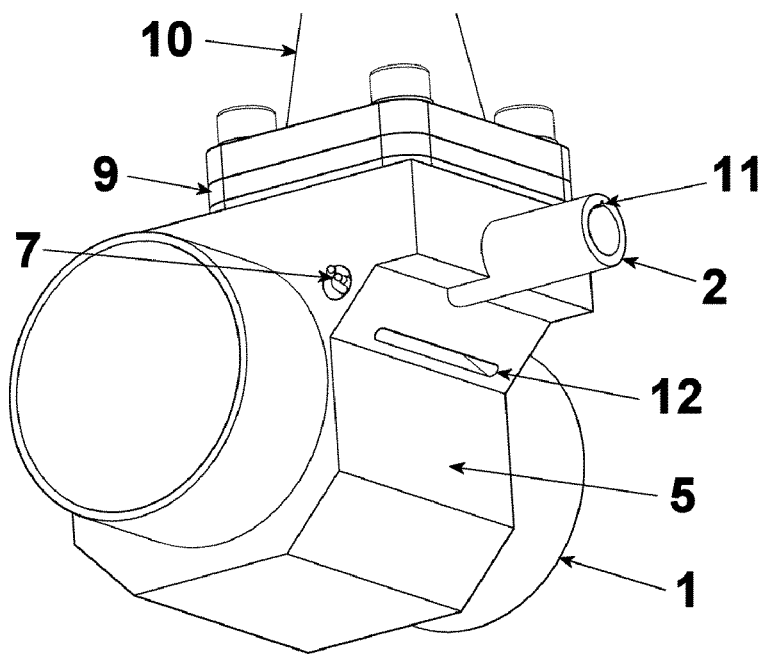
FIG. 1A is another front perspective view of the valve of FIG. 1.
Figure 1B:
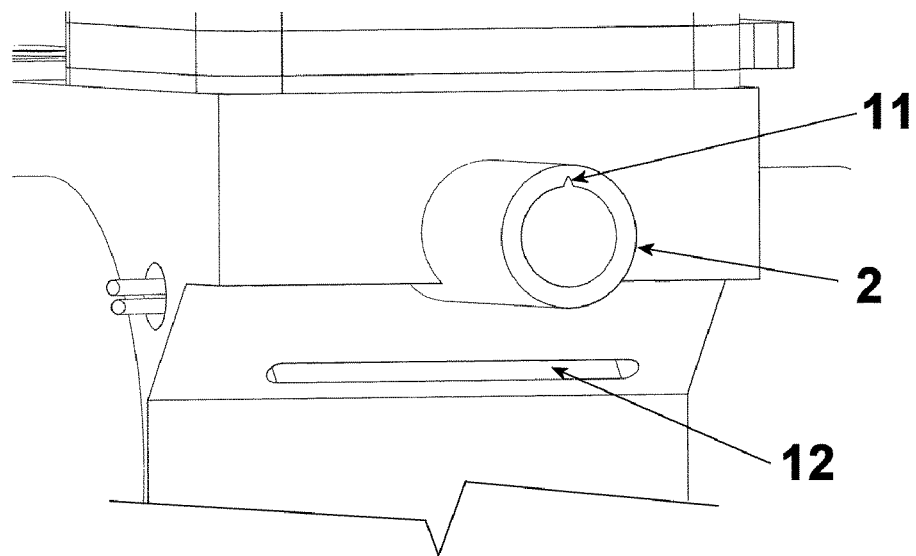
FIG. 1B is an enlarged side perspective partial view of the valve of FIG. 1.

Referring to FIGS. 1-1B, the upstream connector (1), shown attached to the cleanable heated valve body (5), is represented as a perpendicular flow line close coupled to the upstream contoured void (3).

The upstream connector (1), shown attached to the cleanable heated valve body (5), is represented as a perpendicular flow line close coupled to the upstream contoured void (3).

It should be appreciated, however, that the upstream connector is an attachment to supply the medium to the cleanable heated valve body and therefore can take a number of other forms other than that displayed, including but not limited to; another connected valve, plain inlet tube or pipe, associated tube or pipe fittings, vessel or tank wall, wall of sterilising apparatus or the like.

The downstream connector (2) shown attached to the cleanable heated valve body (5) is represented as a plain outlet type nozzle. It should be appreciated, however, that the down steam connector is an attachment to discharge the medium from the clean line heated valve body and therefore can take a number of other forms than that displayed, including but not limited to; another connected valve, perpendicular flow line close coupled to the downstream contoured void (4), plain inlet tube or pipe, associated tube or pipe fittings, vessel or tank wall, sterilising apparatus wall or the like.

The upstream flow-path is defined by an upstream contoured void (3) through which the medium will pass from the upstream connector over the sealing face (6) and through the cleanable heated valve body (5) when the sealing membrane (9) is lifted by operating the flow activation knob (10). The downstream flow-path is defined by a downstream contoured void (4) through which the medium will flow through the cleanable heated valve body (5) from the upstream contoured void (3) over the sealing face (6) into the downstream connector (2) when the sealing membrane (9) is lifted by operating the flow activation knob (10), shown as being suited to manual activation, but may also be automatic such as pneumatic or electronic or the like.

The cleanable heated valve body defines the medium flow path and contains fixing holes (8) to enable the sealing membrane and flow activation knob to be securely attached to the valve body.

Figure 2:
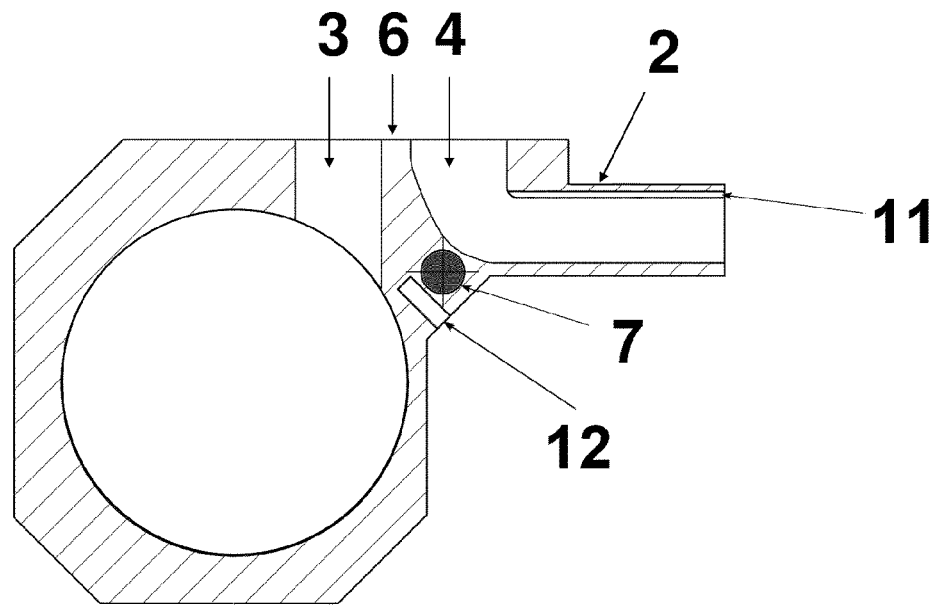
FIG. 2 is a front cross sectional view of the valve of FIG. 1.
Figure 2A:
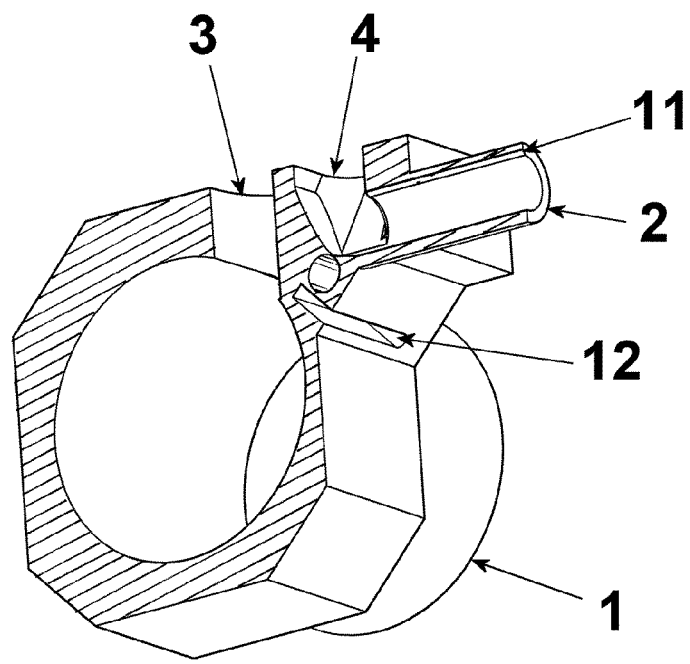
FIG. 2A is a front perspective view of the valve of FIG. 2.

With reference to FIGS. 2-2A, to raise the temperature of the cleanable valve to achieve the desired conditions there is a cylindrical heating element (7) securely fixed into the heated valve body powered by electrical wires. The heating element is positioned so as to not penetrate the smooth cleanable inner surface of the valve nor come into contact with the medium inside or passing through the valve. Where the cleanable heated valve is to be utilised as an outlet to provide a medium free of microbiological contamination, the down stream connector plain outlet type nozzle (2) can be optionally contoured on the upper portion of said nozzle, as shown (11) to help assist in unlocking any held-up medium in the nozzle when the valve is closed in order to promote rapid free draining of the nozzle.

To raise the temperature of the cleanable valve to achieve the desired conditions there is a cylindrical heating element (7) securely fixed into the heated valve body powered by electrical wires. The heating element is positioned so as to not penetrate the smooth cleanable inner surface of the valve nor come into contact with the medium inside or passing through the valve. Where the cleanable heated valve is to be utilised as an outlet to provide a medium free of microbiological contamination, the down stream connector plain outlet type nozzle (2) can be optionally contoured on the upper portion of said nozzle, as shown (11) to help assist in unlocking any held-up medium in the nozzle when the valve is closed in order to promote rapid free draining of the nozzle.

The lower portion of the cleanable heated valve body, between the upstream connector and the cylindrical heating element, can be contoured to remove metal, forming a cavity (12), for the applications where cool medium is flowing in the upstream connector in order to maximise the temperature across the metal sealing face, downstream contoured void and the discharge connector.

The lower portion of the cleanable valve body, between the cylindrical heating element and discharge connector is contoured to remove metal to maximise the temperature in the downstream contoured void and the discharge connector.

The invention claimed is:

1. A valve of a cleanable design capable of maintaining unfavourable conditions for microbial activity on the downstream side and/or outlet of the valve, said valve comprising:
   a smooth and contoured unitary valve body with an integral upstream connector extending from the body, a downstream connector extending from the body, and a smooth and contoured internal shape for providing a defined liquid flow path therebetween, wherein the downstream connector extends from the body for selectively supplying liquid and draining a portion of the liquid passing through the body;
   the internal shape having an upstream void in liquid communication with the upstream connector, the internal shape also having a downstream void in liquid communication with the downstream connector; wherein a sealing face separates the downstream void from the upstream void;
   a flexible sealing membrane cooperating with the sealing face, the sealing membrane being:
   i. selectively moveable into contact with the sealing face of said valve body to close said valve;
   ii. selectively moveable out of contact with the sealing face of said valve body to open and allow draining of said valve by allowing liquid communication through the internal shape; and
   iii. selectively operable to a range of positions relative to the sealing face to vary the flow rate of liquid through said valve; and
   an elongated heater mounted adjacent to the downstream connector and within said valve body in a location so as not to be in contact with the liquid or disrupt the smooth and contoured internal shape and, the valve body being contoured by removal of metal with a slotted cavity forming a thermal break to limit heat to the liquid in the upstream void, said heater being operative to locally heat the downstream void and the downstream connector portion of the valve body to a predetermined temperature.

2. The valve as set forth in claim 1, wherein the heater is capable of raising the temperature at the downstream void and the downstream connector to promote drying by reducing surface tension of the liquid for better draining, and by increasing evaporation.

3. The valve as set forth in claim 2, wherein the heater is capable of raising the temperature on the downstream void and the downstream connector of said valve above 60 C.

4. A valve of cleanable design capable of regulating and or supplying a selected quantity of liquid that possesses enhanced properties at elevated temperatures, said valve comprising:
   a smooth and contoured unitary valve body with an integral upstream connector extending from opposing sides of the body to define a cylindrical passage through the body for supplying liquid, a downstream connector extending transversely from the body to form a branch line for selectively draining a portion of the liquid passing through the body, and a smooth and contoured internal shape formed within the body for providing a defined liquid flow path between the upstream connector and the downstream connector;
   the internal shape having an upstream void in liquid communication with the upstream connector, the internal shape also having a downstream void in liquid communication with the downstream connector; wherein a sealing face separates the downstream void from the upstream void;
   a flexible sealing membrane cooperating with the sealing face, the sealing membrane being:
   i. selectively moveable into contact with the sealing face of said valve body to close said valve;
   ii. selectively moveable out of contact with the sealing face of said valve body to open and allow draining of said valve by allowing liquid communication through the internal shape; and
   iii. selectively operable to a range of positions relative to the sealing face to vary the flow rate of liquid through the valve; and
   an elongated heater mounted between the upstream void and the downstream connector and within a cylindrical cavity formed in said valve body in a location axially offset from the upstream connector so as not to be in contact with the liquid or disrupt the smooth and contoured internal shape and, the valve body being contoured by removal of metal from an exterior surface thereby forming a slotted cavity to provide a thermal break for preventing the heating of the liquid within the upstream connector, said heater being operative to locally heat the downstream void and the downstream connector portion of the valve body to a predetermined temperature and for maximizing the heat conducted into the sealing face that comes into contact with the flexible sealing membrane.

* * * * *